United States Patent Office

2,732,343
Patented Jan. 24, 1956

2,732,343

DRILLING FLUID

David A. Rowe, Houston, Tex., assignor to Sun Oil Company, Philadelphia, Pa., a corporation of New Jersey No Drawing. Application December 31, 1952,
Serial No. 329,129

9 Claims. (Cl. 252—8.5)

This invention relates to drilling fluid for use in the rotary drilling of wells and more particularly to aqueous drilling compositions having desirable stability characteristics under high temperature well conditions.

In drilling wells such as oil or gas wells, the drilling fluid which is circulated into and out of the borehole should have certain properties so that it will perform its desired functions properly. One important characteristic of the fluid is viscosity. It is essential that the fluid have sufficient viscosity to suspend any weighting material present and to suspend the drill cuttings so that they will be carried from the borehole, but the viscosity should not be so high as to render the pumping operation difficult. It is generally desirable that the Stormer viscosity of the drilling fluid be at least 10 and less than 100 centipoises and a more preferable range is 20–40 centipoises. Another desirable property of the drilling fluid is its wall building characteristic, or the ability to form a thin mud sheath on the wall of the borehole that will prevent loss of water to the formations traversed. The customary procedure for improving water loss characteristics of aqueous drilling fluids is by adding a suitable colloid to the mud composition until the water loss is reduced to a desirably low level. Examples of organic colloids used for this purpose are starch, carboxymethylcellulose, hydrolyzed polyacrylates and sulfonated phenolic resins.

The most common drilling fluids are prepared by dispersing in water a colloidal clay such as bentonite in its sodium base form, the clay being added in sufficient amount to impart the desired degree of viscosity to the mixture. In order to secure a mud density sufficient to overcome pressure of the formations penetrated during drilling, weighting materials, such as barytes, iron oxide, etc., are conventionally added.

In drilling deep wells wherein high temperatures and pressures are encountered, the conventional sodium bentonite drilling mud often is not satisfactory. Under the high temperature conditions there is a tendency for the viscosity and gelation characteristics of the mud to increase to such extent that the mud may become unpumpable. A procedure commonly used in an attempt to obviate this difficulty comprises adding certain phosphate compounds to the mud during drilling to reduce viscosity and gelation effects. However, this is often unsatisfactory due to the fact that the phosphates decompose under high temperature well conditions and hence lose their effectiveness.

Another type of drilling mud composition which has been used under high temperature well conditions comprises an aqueous dispersion of bentonite which has been converted to its calcium base form by means of lime, and which contains caustic soda and calcium lignin sulfonate in amounts effective to regulate viscosity and gelation characteristics. Under high temperature well conditions, this type of drilling composition has been found to have a tendency to solidify and may set up solids within the well bore under extreme temperature conditions.

The present invention is directed to an improved drilling composition which, under high temperature well conditions, does not tend to solidify or increase inordinately in viscosity. According to the invention, the drilling fluid composition is prepared by dispersing in salt water finely divided chrysotile asbestos, as hereinafter specified, in amount effective to substantially increase viscosity, and stabilizing the mixture against separation by incorporating an organic colloid in the mixture. It has been discovered that an effective drilling fluid stable at high temperature can be prepared in this manner without the addition of colloidal clay to the mixture.

The asbestos employed in preparing a drilling fluid according to this invention must be derived from the mineral chrysotile and must be one of the grades designated as Nos. 1–6 according to the Standard Canadian Chrysotile Asbestos Classification. (See Encyclopedia of Chemical Technology, vol. 2, 1948, page 138.) This classification system is used throughout the asbestos industry to classify types of chrysotile products according to degree of purity and degree of subdivision with respect to width of the fibers. The lower numbered grades are highly pure, and the fibers are highly subdivided with respect to width which causes the asbestos product to have a high degree of bulkiness. The higher numbered grades are generally of less purity and the fiber widths are greater so that the products are less bulky. It is preferred in practicing the invention to employ grades Nos. 1–3, since the desired increase in viscosity can be effected by means of very small proportions of these asbestos products. However, grades Nos. 4–6 will also effect the desired increase in viscosity if incorporated in larger proportions in the drilling fluid composition. The product grades designated as Nos. 7 and 8 are substantially ineffective for increasing viscosity and are not suitable for use in the present invention.

The amount of asbestos that should be added to the mixture will depend upon the grade used and the viscosity desired, so that definite minimum amounts cannot be specified. As an example, with grade No. 1 asbestos, an amount of 0.5 lb./bbl. of mixture will cause the viscosity to increase substantially above that of the salt water. With grades Nos. 4–6, however, this amount will effect very little viscosity increase so that larger proportions, such as 4–10 lbs./bbl., generally should be employed. It will seldom if ever be necessary for the amount to exceed 16 lbs./bbl. in order to obtain the desired viscosity increase.

The asbestos as finally incorporated in the drilling fluid must be finely divided with respect to fiber length so that it will pass 100 mesh screen (U. S. Sieve Series), and preferably should be as small in particle size as can be obtained practically with conventional grinding equipment. It is most convenient to grind the asbestos before incorporating it in the composition, although the present drilling fluid can also be prepared by finely dividing the asbestos after addition to the salt water if suitable grinding or dispersing equipment is available.

The salt water employed in preparing the present drilling fluid must have a salt content of at least 50,000 p. p. m. and preferably is essentially saturated salt water. The salt water somehow plays an important role in combination with the asbestos, as shown by the fact that no significant increase in viscosity can be obtained if the asbestos is dispersed in water containing substantially less than the above specified minimum amount of salt.

The organic colloid incorporated in the composition is required in order to stabilize the asbestos-salt water mixture against separation. If the organic colloid is omitted, the mixture will separate into layers with the asbestos usually rising to the top due to the presence of air bubbles occluded during mixing. As the organic colloid, any of the usual materials heretofore used in drilling muds to reduce the water loss characteristics may be used, for example, pre-gelatinized starch, sodium carboxymethylcellulose, hydrolyzed polyacrylates or sulfonated phenolic resins. For compositions prepared with salt water which is largely saturated with salt, starch is a preferred material to employ as the organic colloid.

The amount of organic colloid used should be sufficient to inhibit separation of the asbestos-salt water dispersion. The minimum amount may vary but generally is of the order of 2 lbs./bbl. of drilling fluid. This amount, however, has little effect in improving water loss characteristics of the composition, so that it is preferable to use a larger amount in order to secure a desirably low water loss value. In most instances, the amount of organic colloid added will be in the range of 6–14 lbs./bbl. Amounts in excess of 18 lbs./bbl. effect no further substantial improvement in the drilling fluid properties and seldom if ever would be employed.

The following examples are illustrative of the invention:

*Example I*

Two compositions were prepared from salt water saturated with sodium chloride at room temperature, grade No. 1 Arizona chrysotile fibers and starch as the stabilizing organic colloid. The amounts of chrysotile incorporated in these mixtures were 1.0 and 2.0 lbs./bbl. respectively. In each case the proportion of starch was 2.0 lbs./bbl. The mixtures were agitated thoroughly by means of a Waring blendor to disperse the chrysotile into fine particles of size substantially smaller than 100 mesh. The resulting blends had no noticeable tendency to separate into layers, which would not be the case if the starch had been omitted. Viscosities were determined by a Stormer viscosimeter for comparison with the viscosity of saturated salt water alone. Results were as follows:

|  | Viscosity, centipoises |
|---|---|
| Saturated salt water | 3 |
| Blend #1 (1.0 lb./bbl. asbestos) | 31 |
| Blend #2 (2.0 lbs./bbl. asbestos) | 48 |

These results show that the grade of asbestos here used was very effective in increasing the viscosity, and that a drilling fluid having a Stormer viscosity of at least 10 could be prepared by using considerably less than 1.0 lb. of asbestos per barrel.

*Example II*

Two other blends were prepared in the same manner as blend #1 of the preceding example, except that the starch content was increased to 4.0 and 8.0 lbs./bbl. respectively. A. P. I. water loss values were determined and compared with the value for blend #1 which contained only 2.0 lbs. of starch per barrel.

| Amount of Starch | A. P. I. Water Loss |
|---|---|
| 2.0 lbs./bbl. | blew dry in 26 minutes. |
| 4.0 lbs./bbl. | 65 c. c. |
| 8.0 lbs./bbl. | 14 c. c. |

These results show that the water loss is effectively reduced by increasing the starch content and that a desirably low value can be reached by using a sufficient amount of starch.

*Example III*

Several other blends were made in a manner similar to that described in Example I but in this case various grades of Canadian chrysotile were used. Starch in amount of 2.0 lbs./bbl. was incorporated in each blend. None of the blends showed any tendency to separate upon standing. The resulting Stormer viscosities are shown in the following tabulation:

| Grade of Asbestos | Amount of Asbestos, lbs./bbl. | Viscosity, centipoises |
|---|---|---|
| 4M | 2.0 | 8 |
| 4M | 4.0 | 26 |
| 5R | 2.0 | 8 |
| 6D | 2.0 | 7 |
| 7M | 2.0 | 3 |

These results show that grades Nos. 4, 5 and 6 will increase viscosity but that they are not as effective as grade No. 1 described in Example I. Hence, in order to reach a given viscosity value for the drilling fluid composition, larger proportions of grades Nos. 4–6 will be required. The viscosity of the blend containing the No. 7 grade asbestos was the same as that of the salt water alone, indicating that this grade is not suitable for the present purpose.

*Example IV*

By way of comparison, a blend of saturated salt water, starch in amount of 2.0 lbs./bbl. and 2.0 lbs./bbl. African blue crocidolite—another type of mineral from which asbestos is derivable—was found to have essentially the same viscosity as salt water alone. This indicates the importance of chrysotile as the type of asbestos for use in preparing compositions according to the present invention.

*Example V*

A series of blends were made up for comparison with blend #1 of Example I, the same materials being used in the same amounts except that the salt content of the water was varied as shown in the tabulation below:

| Salt Content | Viscisity, centipoises |
|---|---|
| None | 1 |
| 30,000 p. p. m. | 1 |
| 50,000 p. p. m | 8 |
| Saturated (Blend #1) | 31 |

These results show that no increase in viscosity is effected when the salt content is substantially below 50,000 p. p. m. Best results are obtained when the salt water is essentially saturated.

*Example VI*

A drilling fluid was prepared according to the present invention with the following composition:

350 c. c. saturated salt water
2 g. asbestos grade No. 4M
8 g. starch
1 g. pre-solubilized quebracho-tannin mixture
2 g. caustic soda
550 g. barium sulfate The purpose of the barium sulfate was to serve as weighting agent. The blend was thoroughly mixed by means of a Waring blendor, resulting in a drilling fluid having a weight of 15.4 lbs./bbl. and no appreciable tendency to stratify upon standing at room temperature. The composition was heated in a bomb at 400° F. for a time of about 65 hours to determine its high temperature stability characteristics. Tests before and after heating were as follows:

|  | Before Heating | After Heating |
|---|---|---|
| Stormer viscosity, centipoises | 58 | 30 |
| Initial gel strength | 0 | 0 |
| 10 minute gel strength | 15 | 0 |
| A. P. I. water loss, c. c. | 4.8 | 61.4 |

These results indicate that this composition is especially satisfactory for use under high temperature conditions, particularly in view of the severe test conditions employed. The decrease in viscosity upon heating is opposite to the effect obtained with usual drilling muds containing clay and is not undesirable. The increase in water loss and decrease in 10 minute gel strength were due to disintegration of starch which inevitably will occur at high temperature over the course of time. It was found, however, that by adding starch to the mixture after heating, the water loss could again be reduced to a low value and that the composition was restored essentially to its original condition.

The present invention provides, in addition to compositions as illustrated in the preceding examples, an emulsion drilling fluid of the oil-in-water type. This can be prepared by adding any suitable oil, such as crude oil or diesel oil, to compositions as already described herein and dispersing the oil by adding an emulsifying agent suitable for use in salt water, particularly, low molecular weight sodium lignin sulfonate. The resulting emulsion composition will have the additional advantages which have been found for known emulsion type drilling fluids, such as more efficient lubrication of bit and bearings and decreased torque.

Compositions prepared according to the present invention are particularly useful not only as the fluid for circulation during the operation of drilling high temperature wells but also as a composition for filling a portion of the bore hole which is to be sealed off from productive strata by means of a packer. For example, when the lower part of the borehole is sealed by a packer and the well is produced from a level above the packer, the lower part may be filled with a composition prepared according to the invention. The stability of the composition is advantageous in facilitating subsequent re-working of the well.

In my copending application Serial No. 327,907, filed December 24, 1952, there is described and claimed a drilling fluid prepared by dispersing in water a colloidal clay along with a minor proportion of chrysotile asbestos. The present invention is distinguished from the invention of said application in that no colloidal clay is purposely added, and further in that salt water of the specified salt content is required and that an organic colloid is essential for stabilizing the mixture. It is to be understood, however, that in drilling a well with the composition of the present invention, some amount of clay will inevitably become dispersed in the composition, but the amount of clay present will be relatively small since none has been purposely added. The lack of stability of previous drilling muds under well conditions is due to the relatively high content of clay which undergoes some sort of structural change at high temperature that results in increased viscosity or solidification of the mud. The fact that the drilling fluid of the present invention has no added clay so that its clay content during drilling reaches only a low value accounts for its improved stability characteristics.

I claim:

1. A drilling fluid comprising salt water containing at least 50,000 p. p. m. of salt and having dispersed therein chrysotile asbestos of grade designation in the range inclusive of No. 1 to No. 6 (Standard Canadian Chrysotile Asbestos Classification), said asbestos being of a fineness such that it will pass 100 mesh and being present in amount to substantially increase viscosity, and an amount of organic colloid effective to inhibit separation of the dispersion.

2. A drilling fluid according to claim 1 in which the asbestos is of grade designation in the range of No. 1 to No. 3 inclusive.

3. A drilling fluid according to claim 1 in which the salt water is essentially saturated with salt.

4. A drilling fluid according to claim 3 in which the organic colloid is starch.

5. A drilling fluid according to claim 1 in which the asbestos is of grade designation in the range of No. 1 to No. 3 inclusive, the salt water is essentially saturated with salt, and the organic colloid is starch.

6. A drilling fluid comprising salt water containing at least 50,000 p. p. m. of salt and having dispersed therein chrysotile asbestos of grade designation in the range inclusive of No. 1 to No. 6 (Standard Canadian Chrysotile Asbestos Classification), said asbestos having a particle size substantially smaller than 100 mesh and being present in amount between 0.5 and 16 lbs./bbl. sufficient to substantially increase viscosity, and an organic colloid in amount between 2 and 18 lbs./bbl. effective to inhibit separation of the dispersion.

7. A drilling fluid according to claim 6 in which the salt water is essentially saturated with salt.

8. A drilling fluid according to claim 7 in which the organic colloid is starch.

9. A drilling fluid according to claim 6 in which the asbestos is of grade designation in the range of No. 1 to No. 3 inclusive, the salt water is essentially saturated with salt, and the organic colloid is starch.

References Cited in the file of this patent

UNITED STATES PATENTS

| | | |
|---|---|---|
| 1,629,714 | Kraus | May 24, 1927 |
| 2,214,366 | Freeland et al. | Sept. 10, 1940 |
| 2,417,307 | Larsen | Mar. 11, 1947 |
| 2,473,392 | Russell | June 14, 1949 |
| 2,488,304 | Malott | Nov. 15, 1949 |